Patented July 9, 1946

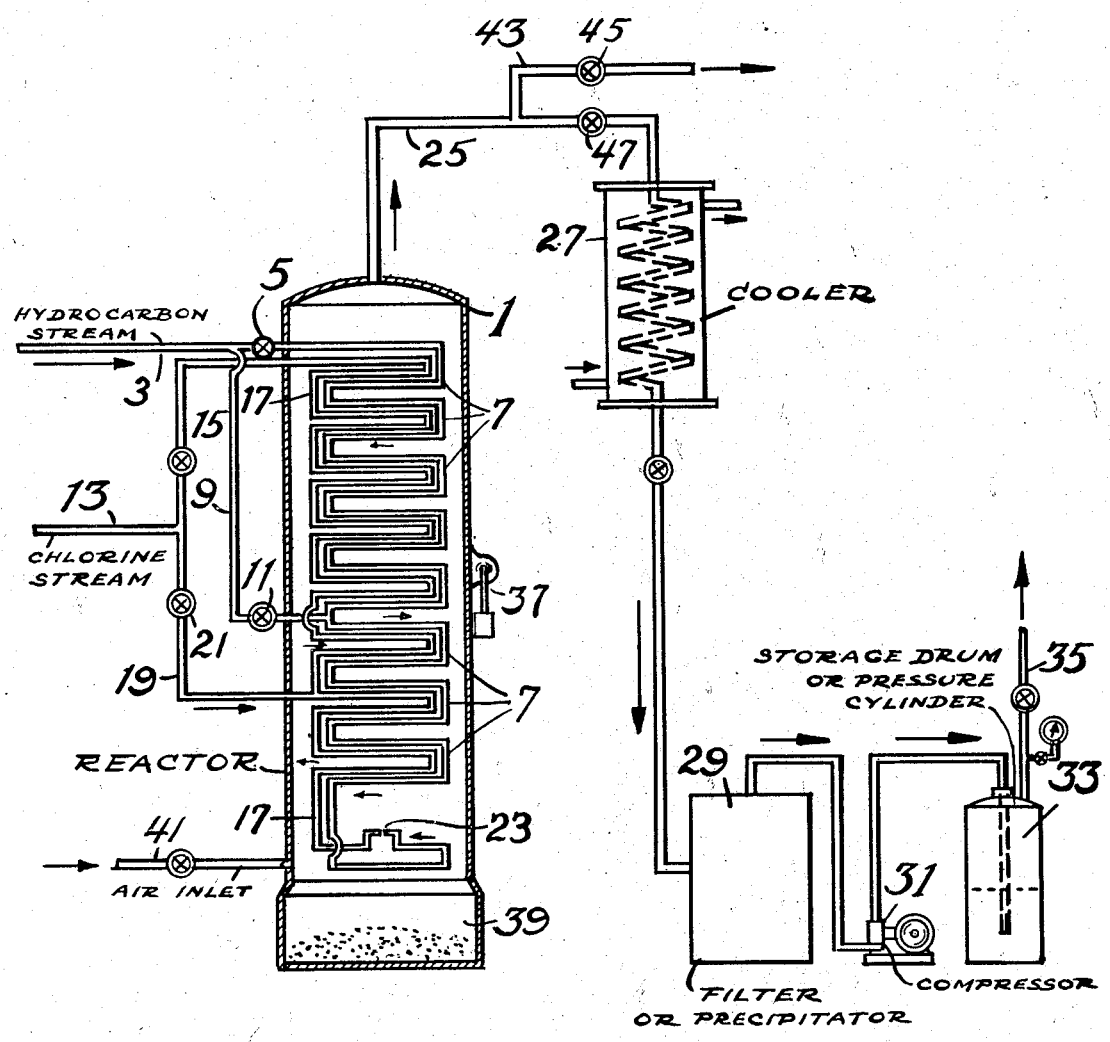

2,403,735

UNITED STATES PATENT OFFICE 2,403,735

HYDROGEN CHLORIDE MANUFACTURE

Ralph Burgess Mason and Jerry A. Pierce, Baton Rouge, La., assignors to Standard Oil Development Company, a corporation of Delaware Application November 26, 1942, Serial No. 467,054

4 Claims. (Cl. 23—156)

This invention concerns a continuous method for the preparation of hydrogen chloride. The invention relates in particular to the preparation of hydrogen chloride by the intercombustion of chlorine and the readily available gaseous hydrocarbons such as are present in oil field and petroleum refinery locations.

The preparation of hydrogen chloride by the reaction of chlorine and methane in the presence of air has been known for some time. When air is used to assist or support the combustion of chlorine and methane the product is diluted with a large amount of inert gases. These diluents have to be removed for the more important commercial uses of hydrogen chloride. Absorption of the reaction product in water to remove the diluents is disadvantageous since the scrubbing system has to be constructed of relatively costly materials in order to be resistant to corrosion. Furthermore, absorption of hydrogen chloride in water is particularly undesirable when the anhydrous compound has to be prepared, such as is necessary in the preparation of organic halides by the reaction of hydrogen chloride with unsaturated compounds; and when hydrogen chloride is employed as a catalyst promoter with aluminum chloride in reactions, such as isomerization, alkylation, polymerization, and the like.

To effect the intercombustion of chloride and gaseous hydrocarbons burners modeled after those commonly employed to prepare hydrogen chloride by the combustion of hydrogen and chlorine were found to be unsatisfactory. With such burners substantial quantities of chloro-hydrocarbons and other by-products were formed and in general intercombustion was incomplete. Improved, but still unsatisfactory, functioning was obtained with a burner in which the reactants were mixed by impingement. Satisfactory intercombustion was found to occur only when the reactants were preheated and then brought together at the burner preferably by impingement, and then the combustion products held at temperatures between 1200° F. and 2000° F. for a short period of time. Under these conditions it was found that the normally gaseous hydrocarbons and chlorine reacted to form hydrogen chloride and carbon almost quantitatively. Furthermore, it was found that the intercombustion under such conditions, especially when effected at substantially atmospheric pressure, proceeded smoothly and without hazard provided feed rates and reaction conditions were adjusted to prevent substantial quantities of unreacted chlorine being present in the exit gases.

It is an object, therefore, of the present invention to prepare hydrogen chloride in a high degree of purity from chlorine and gaseous hydrocarbons in the absence of air, and thus to prepare hydrogen chloride suitable for immediate use in reactions requiring this compound in the anhydrous condition.

Another object of the invention is to prepare hydrogen chloride in a high degree of purity and free from contamination with organic halides by the intercombustion of chlorine and easily available normally gaseous hydrocarbons.

A further object of the invention is to prepare hydrogen chloride in a high degree of concentration without employing water to effect concentration of the hydrogen chloride.

Other objects will be apparent from the following description and illustrations of the invention:

According to the invention, chlorine and any one, or a mixture, of the normally gaseous hydrocarbons are separately heated to a temperature between 1200° F. and 2000° F., and then brought together in a confining space or chamber. The gases ignite spontaneously and a continuous flame is established at the point of physical union, giving as the products of combustion essentially hydrogen chloride and carbon. The reaction products are held for a short period of time within a confining space or chamber at about the reaction temperature. During this period any small amounts of chloro-hydrocarbons formed in the combustion are decomposed to hydrogen chloride, carbon, and hydrogen. The hydrogen chloride is then conducted from the combustion chamber and collected as conveniently suitable. The carbon formed in the reaction is partly deposited on the burner and such parts of the preheating equipment as occur in the reaction chamber. Another portion of the carbon is entrained in the product gases and removed from the reactor.

In the preferred form of the invention the heat of reaction of the chlorine and hydrocarbon gas is utilized by means of suitable heat exchange apparatus to preheat the reactants to the desired temperature. The chlorine and hydrocarbon gas, for example, natural gas comprising essentially methane, are heated separately by passing through tubular or coil type heat exchangers disposed in the space where the intercombustion occurs. The tubes or coils terminate at a common point where the reaction occurs with evolution of large amounts of heat. Since carbon is formed as a product of the reaction and is deposited to some extent within the reactor and on the elements of the heat exchanger, it becomes necessary at regular intervals to discontinue processing and to remove the deposited carbon. Consequently, it is desirable to operate pairs of reactors so that one may be in operation while the other is being cleaned of carbon, and continuous production of hydrogen chloride thus maintained. A common recovery system for the hydrogen chloride may be used for each pair of reactors.

The method commonly employed for collecting the hydrogen chloride is to pass the reactant gases through a series of filters or a Cottrell precipitator for removing the entrained carbon and then to a compression system for liquefying the hydrogen chloride. The carbon collected in the reaction zone, in addition to that entrained in the hydrogen chloride, may be recovered from the reaction system by the use of scrapers, and collection of the carbon black made in a hopper below the burner equipment after the reaction has been terminated and the equipment cooled. Carbon still adhering onto the burner equipment can be removed by subsequently burning in air and utilized as an auxiliary source of heat for preheating reactants or for other purposes, if so desired. However, the reaction of chlorine with hydrocarbon gases is so highly exothermic that more than sufficient heat is ordinarily available in the combustion zone for preheating the reactants. In fact, in some cases coolers may be required to prevent overheating of the reactor.

An important feature of the invention is the particular manner in which the chlorine and the gaseous hydrocarbons are brought into contact so as to effect their mutual combustion at the point of physical union in a confined space in the absence of other gaseous materials. Many types of apparatus may be devised as embodiments of the invention.

As an illustration of the invention and embodiment thereof the following description and attached drawing are presented:

In the drawing, numeral 1 indicates a confining chamber such as a tower or elongated vessel in which the reaction takes place. The hydrocarbon gas enters through line 3 containing valve 5 and passes into coil 7 disposed in reactor 1 wherein the gases are preheated to the desired temperature. If it is desired to heat the hydrocarbon to a lower temperature than results from passing it through the entire length of coil 7, valve 5 may be closed and the hydrocarbon passed through line 9 and valve 11, and thus through only a part of coil 7. By adjusting valves 5 and 11, part of the hydrocarbon can be passed through the entire length of the coil, and part through only a fraction of the length of the coil so that temperatures of varying degrees can be obtained. The chlorine is fed through line 13 and valve 15, and passes into coil 17 disposed similarly in reactor 1, to coil 7. As in the case of the hydrocarbon gas, the temperature to which the chlorine is preheated may be regulated by passing all or part of it through line 19 and valve 21. The materials of which coils 7 and 17 are constructed must be capable of withstanding corrosive atmospheres at high temperatures, for example, in the range of 1200° F. to 2000° F. Quartz is a suitable material for these tubes.

The coils 7 and 17 terminate in a burner 23 in which the nozzles are arranged in such a manner as to impinge the two gas streams on to each other. The chlorine and the hydrocarbon may be heated to the same or different temperatures, but should be in the approximate range of 1200° F. to 2000° F. The chlorine and the gaseous hydrocarbon react to form hydrogen chloride and carbon. The reaction products pass upward in the reactor 1, and are withdrawn through line 25 and cooler 27 to the carbon recovery system 29. While part of the carbon is withdrawn in suspended form along with the gaseous hydrogen chloride, another portion of the carbon is deposited on the walls of the reactor 1 and on the coils 7 and 17, and may be eventually removed as will be described hereinafter. A suitable carbon recovery system comprises several bag filters in series followed by a Cottrell precipitator. However, other known types of recovery equipment may be used.

The filtered reaction products are compressed in compressor 31 to a sufficient pressure to liquefy the hydrogen chloride which is passed to a storage drum or pressure cylinder 33 from which non-condensible gases are vented through line 35.

As mentioned previously, some of the carbon produced in the reaction deposits within the reactor. When this carbon deposit is sufficient to interfere with the reaction in any way, such as by causing an excessive pressure drop through the reactor or retarding the rate of heat exchange between products and reactants, flow of reactants is terminated in the system described while a flow of reactants is started in a similar parallel reactor system. The same product recovery system may be used for both reactors. Part of the carbon may be removed from the off-stream reactor by tapping the equipment with a hammer 37, thus dislodging most of the carbon adhering to the sides of the reactor and from some portions of the coils 7 and 17. This carbon is allowed to drop into a hopper 39 at the bottom of the reactor from which it may be recovered. Scrapers may also be used to remove carbon from the reactor and heat exchangers. In case the carbon is to be recovered by scrapers, it will be most convenient to construct the heat exchangers of straight tubes rather than coil-type elements. Some carbon will remain in the reactor system, and must be removed by combustion with air which is admitted through line 41. Torch gas may be admitted with the air if necessary to reach combustion temperatures. Products of combustion may be removed through line 43 and valve 45 by closing valve 47 in line 25.

With the equipment of the type thus described the following results were obtained:

| | | | |
|---|---|---|---|
| Approx. reactor temp., °F | 1,450 | 1,700 | 2,000 |
| Hours of run | 1 | 1 | 1 |
| Methane feed, parts/min | 92 | 92 | 106 |
| Chlorine feed, parts/min | 800 | 850 | 900 |
| Wt. percent excess methane (above theoretical) | 2 | 0 | 5 |
| Wt. percent excess chlorine (above theoretical) | 0 | 4 | 0 |
| Chlorine in exist gas, parts/min | 0 | 4.4 | 0 |
| Theoretical HCl prod., parts/min | 825 | 840 | 925 |
| Actual HCl prod., parts/min | 798 | 823 | 882 |
| Percent hydrogen chloride produced (based on chlorine feed) | 97 | 98 | 95 |
| Percent chlorine unreacted | 0 | 0.5 | 0 |

These data indicate that at elevated temperatures methane and chlorine react to form hydrogen chloride and carbon almost quantitatively. The extent of the reaction is shown to be approximately the same in the temperature range 1450° F. to 2000° F. The carbon black recovered from the reactor, as well as from the filters and precipitator, is of a suitable grade for a variety of uses.

It should be obvious that the disclosure is capable of some variation within the scope of the inventive concept as set forth in the previous description, and that the invention should not be considered limited by the foregoing specific embodiments described for purposes merely of illustration. The invention on the other hand is to be determined by the following claims.

What is claimed is:

1. A process for preparing hydrogen chloride by the reaction of chlorine with a normally gaseous hydrocarbon which consists in heating separately chlorine and a normally gaseous hydrocarbon by the heat generated by their reaction, bringing said heated gases in separate conduits together to a common point, burning the two gases at the point of contact, one supporting the combustion of the other, and recovering the hydrogen chloride thus formed.

2. A process for preparing hydrogen chloride according to claim 1, in which the normally gaseous hydrocarbon is a petroleum field gas.

3. A process for preparing hydrogen chloride according to claim 1, in which the normally gaseous hydrocarbon is a petroleum refinery gas.

4. A process for preparing hydrogen chloride according to claim 1, in which the normally gaseous hydrocarbon is methane.

RALPH BURGESS MASON.
JERRY A. PIERCE.